United States Patent [19]
Bird

[11] Patent Number: 6,157,659
[45] Date of Patent: Dec. 5, 2000

[54] METHOD OF AND APPARATUS FOR MULTIPLEXING AND DEMULTIPLEXING DIGITAL SIGNAL STREAMS

[75] Inventor: Peter Dane Bird, Kanata, Canada

[73] Assignee: Nortel Networks Corporation, Montreal, Canada

[21] Appl. No.: 08/995,414

[22] Filed: Dec. 19, 1997

[51] Int. Cl.[7] .................................................. H04J 3/00
[52] U.S. Cl. .......................... 370/538; 370/252; 370/540
[58] Field of Search ................................. 370/538, 532, 370/230, 231, 232, 235, 535, 537, 540, 505; 375/225, 371, 372, 364

[56] References Cited

U.S. PATENT DOCUMENTS 4,961,188  10/1990  Lau ........................................ 370/94.2
5,260,978  11/1993  Fleisher et al. ......................... 375/106
5,608,731   3/1997  Upp et al. .............................. 370/516
5,694,397  12/1997  Burton ................................... 370/516
5,896,427   4/1999  Muntz et al. ........................... 375/372

*Primary Examiner*—Ricky Ngo

[57] ABSTRACT

Multiplexing and demultiplexing are commonplace for an efficient bandwidth utilization in telecommunications. SRTS (Synchronous Residual Time Stamp) technique is widely used for timing recovery in processing of digital signal streams. The bit stuffing is also prevalent for various purposes, one being rate adjustment. The invention performs the SRTS technique entirely digitally to monitor the rate of slower speed signal streams in relation to the rate of a higher speed stream. The digital implementation permits the use of context switching for processing a plurality of digital signal streams. As the result, hardware requirement is greatly reduced.

8 Claims, 9 Drawing Sheets

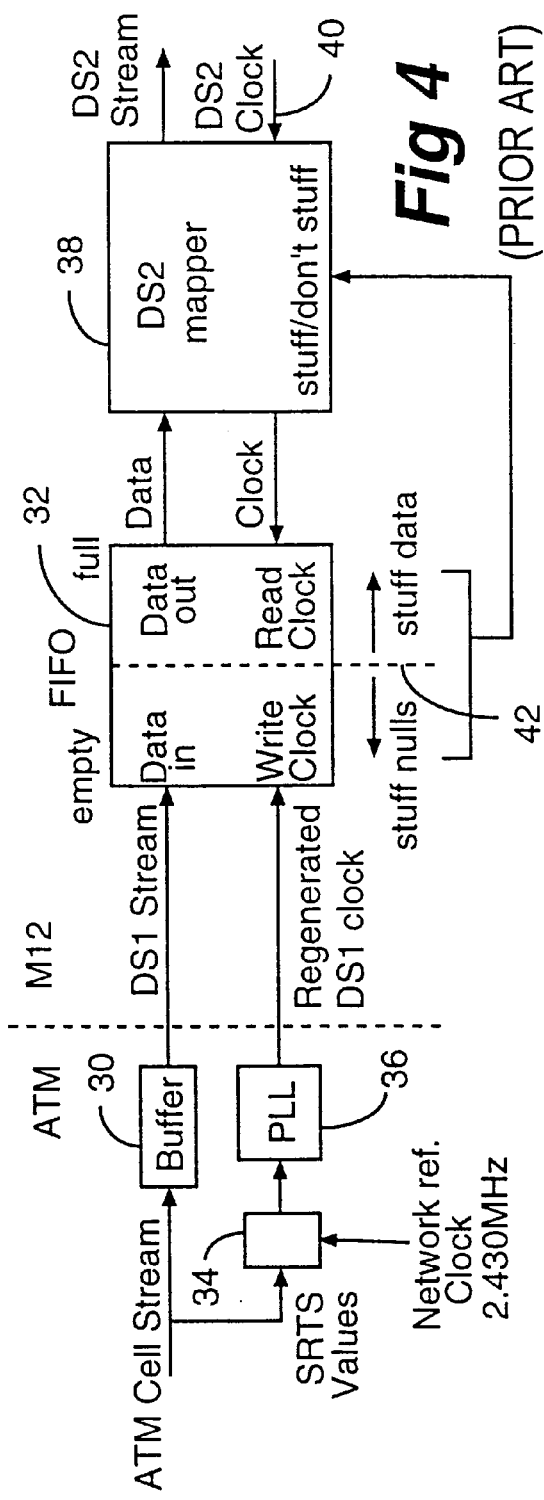
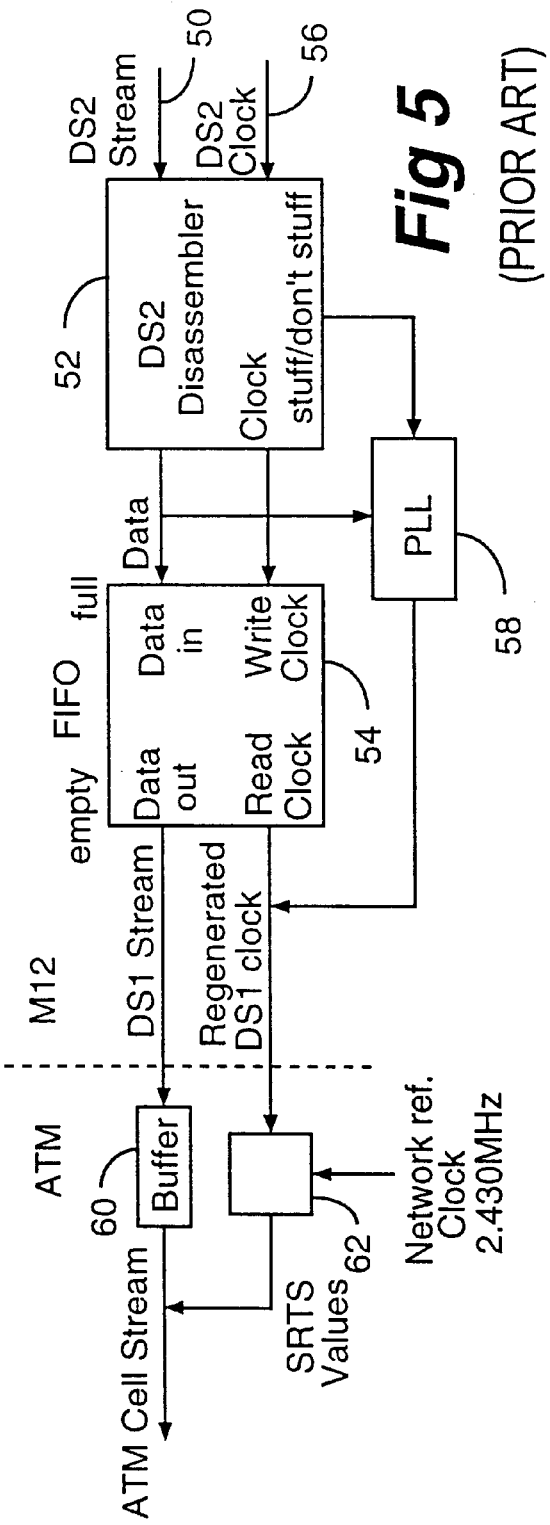
Fig 4 (PRIOR ART)
Fig 5 (PRIOR ART)

METHOD OF AND APPARATUS FOR MULTIPLEXING AND DEMULTIPLEXING DIGITAL SIGNAL STREAMS

FIELD OF INVENTION

The invention resides generally in the field of multiplexing and/or demultiplexing of a plurality of digital signal streams. In particular, it relates to rate adjustment of digital signal streams in connection with multiplexing/demultiplexing by using SRTS (Synchronous Residual Time Stamp) values.

BACKGROUND OF INVENTION

In digital telecommunications systems, digital signal streams are transported at a variety of rates, synchronously or asynchronously, and in all cases, clocks are used for processing these digital signal streams. These clocks must be brought into synchrony for proper data exchange and timing information of some form is transported from the source to destination. Digital signal streams are also frequently regenerated at a proper rate as they experience signal deterioration by noise, delays, jitter etc. They are also multiplexed to produce higher bit rates for higher capacity transmission systems, as a means of utilizing the same transmission medium economically for many different users. In multiplexing, there are more than one digital transmission hierarchies for telecommunications for different parts of the world. FIG. 1 shows one example of digital hierarchies used in North America. In the Figure, four DS1 signal streams are multiplexed into one DS2 signal stream and 7 DS2 signal streams are then multiplexed into a DS3 signal stream. The bit rates of levels are also shown in the Figure. A major problem of multiplexing involves synchronizing the input signal streams. Digital signal streams cannot be directly interleaved and guaranteed their subsequent identification unless the pulse rates of all the signal sources are locked to a common clock. This means that all the signal streams are frequency synchronous, or else they are asynchronous and brought into frequency synchronism by the multiplexer. The multiplexer system can establish frequency synchronism by increasing the bit rate of each separate input to one common rate before combining them into one bit stream. This adds extra time slots into which extra pulses can be stuffed. In pulse stuffing, all incoming digital signal streams are stuffed with a sufficient number of pulses to raise each of their rates to that of the desired common rate. In demultiplexing, a single signal stream of a high rate is split into a plurality of signal streams. Each of the split signal streams is stripped of stuffed bits which are so identified and is desynchronized into a single signal stream of a lower rate according to the common clock.

By referring to FIG. 2, this rate adjustment can be explained in more detail. For example, FIG. 2 shows the structure of a DS2 signal stream which consists of 1176 bits in a frame called M-frame which is made up of 4 subframes, each of 294 bits. Each subframe includes a stuff block in which one specific bit position is reserved for stuffing. This position is used for stuffing a null bit if stuffing is required or it can be used for data bit if no stuffing is required. Therefore, when the stuff position is used for data, there are 6×48=288 bits of DS1 data in a DS2 M frame. When a null bit is put in the stuff position, there are 287 bits of DS1 data per DS2 frame. Therefore, the DS1 data rate can be adjusted by changing how often the stuff position is used for null bit or data bit. The range of adjustment therefore is from 6.312×287/1176=1.5404 Mb/s to 6.312×288/1176=1.5458 Mb/s.

FIG. 3 shows the structure of DS3 signal stream. A DS3 stream consists 4,760 in an M-frame which is made up of 7 subframes, each of 680 bits. The stuff position in each subframe is also arranged in a similar fashion as in DS2 stream. Therefore in a DS3 stream, there are 7 stuff positions in one M-frame, one per DS2.

It should be noted that although DS streams are described in detail above, essentially similar digital signal hierarchies are used in Europe and elsewhere such as E1, E2, and E3. The number of bits in a frame, specific bit assignments etc. may be different among them but the concept of the invention is equally applicable to any of these digital signal streams.

A broadband network such as SONET handles ATM traffic in addition to other synchronous traffic. While a network is synchronous in operation, ATM traffic is asynchronous in nature and thus such a data stream experiences the cell jitter, cell delay variation and other fluctuations as it moves through the network toward a destination node. Even when an ATM network is transporting a CBR (constant bit rate) stream between a source node and a destination node, the clock frequency at the destination node cannot be traced directly back to that of the source node by the regular, periodic arrival of the CBR stream. A few techniques have been used to convey the difference between the network clock frequency and the service clock frequency (frequency of the data being transported). U.S. Pat. No. 5,260,978 Nov. 9, 1993 Fleischer et al describes a technique called SRTS (Synchronous Residual Time Stamp) for timing recovery in a broadband network. The patent shows that only a small number of overhead bits (called P bits) are required to express unambiguously the variation from a nominal value of the difference between the two clock frequencies. The P bits are called SRTS bits. The resolution is governed by the nominal value of the frequency difference and the clock tolerance, and determines the required minimum number of P-bits. Under normally expected parameters, the number of these P-bits would be significantly smaller than the number of bits that would be required to express the clock frequencies, e.g. 3 bits instead of 13 bits. A typical sampling period is 3008 which corresponds to a period of 8 ATM cells and a 47 octet payload per cell.

The SRTS method described in the above-referenced patent makes use of phase locked loops (PLLs) to generate an analog clock signal derived from the SRTS values. U.S. Pat. No. 5,608,731 Mar. 4, 1997 Upp et al, on the other hand, describes a digital closed loop clock recovery for SRTS. In the patent, 4 bits are used for SRTS to recover clock pulses of a DS1 signal stream.

FIG. 4 illustrates a functional block diagram in the Tx direction of a typical DS1/DS2 multiplexer (often called M12 multiplexer). As mentioned earlier, in the multiplexer, before combining the lower rate signal streams, the service clock of each lower rate signal stream must be recovered in relation to the network reference clock and then each lower rate signal must be rate adjusted to be synchronous with each other by appropriate stuffing. Therefore in FIG. 4, ATM cells from the network are buffered at buffer 30 and a DS1 signal stream is fed to a FIFO 32. Meanwhile, SRTS values are captured from the ATM cell stream. They are then processed at 34 by referring to the network reference clock, e.g., 2.430 MHz and a DS1 clock is regenerated through PLL 36. At FIFO, the incoming DS1 signal stream is written in in response to the regenerated DS1 clock. On the other hand, DS1 signal stream stored in the FIFO are read out and sent to DS2 mapper 38 in accordance with the clock signal obtained from DS2 clock 40. Whenever the FIFO reaches a certain threshold of fullness, the DS2 mapper will stuff in DS1 data into the stuff position. When this happens the rate at which the FIFO is emptied increases and eventually the fullness of the FIFO will drop below a threshold 42 and the DS2 mapper will then put nulls into the stuff position. Having adjusted each DS1 signal stream into alignment with each other by proper stuffing, DS2 mapper maps four DS1 signal streams into a DS2 signal stream.

FIG. 5 illustrates a functional block diagram in the Rx direction of a known M12 multiplexer. A DS2 signal stream 50 is disassembled at a disassembler 52 to DS1 signal streams, each DS1 signal stream properly destuffed. Each DS1 signal stream is sent and stored in FIFO 54 according to write clock derived from DS2 clock 56. Each DS1 stream is read out from the FIFO according to a regenerated clock for the respective DS1 stream. The respective clock is regenerated from the data bits coming out of the disassembler and the stuff/don't stuff signal through a PLL 58. The data is read out of the FIFO in accordance with this recovered clock and stored in the ATM cell buffer 60. SRTS values are calculated at 62 with respect to the network reference clock and inserted into the appropriate places in the ATM cells as they are sent to the ATM network.

While an M12 multiplexer is described above, in actual practice it is more common that DS1 signal streams are multiplexed into a DS3 signal stream at the same location. As shown in FIG. 6, this is performed by a series of M12 and M23 multiplexing. In the Figure, seven M12, each with an appropriate stuffing operation at 66 are combined to generate a DS3 signal stream. Some stuffing determination based on various means is performed here.

When 28 DS1 signal streams are multiplexed to or demultiplexed from a DS3 signal stream, the range of difference in DS1 clock frequencies among all DS1 signal streams is greater than it would be when only one DS1 signal stream is regenerated as done in the above prior art SRTS techniques, producing wider swings in SRTS values.

The SRTS clock recovery techniques discussed above deal mainly with regenerating a digital signal e.g. DS1 signal which is already fairly narrowly bounded. These techniques therefore do not have a sufficient dynamic range to deal with multiplexing and demultiplexing of DS1 and DS3 streams.

The multiplexer/demultiplexer of the invention makes use of the SRTS technique but it is entirely digital in operation. It also handles digital signal streams of wider hierarchies, such as signals spanning between DS1 and DS3. As the operation is entirely digital, the technique of context switching can also be applied to it. In one embodiment, the contents of the various registers that make up the inventive algorithm are stored in a memory for each of the 28 DS1 signal streams. As each DS1 signal stream is processed, the values for the registers are loaded from the memory, the registers are updated appropriately, and the new values stored back into memory. By making the algorithm completely digital, one avoids an analog PLL, the device pins that it needs, as well as any external components that a PLL may require for each of the 28 DS1 signal stream. Furthermore, context switching allows a single set of hardware registers along with a memory to replace 28 sets of the DS1 hardware registers which would be required for the prior art techniques mentioned above. It is therefore possible to achieve significantly higher levels of integration.

A copending application Ser. No. 08/659,395 filed on Jun. 6, 1996, inventors Coady et al describes in detail the invention relating to context switching of a plurality of digital signal streams.

OBJECTS OF THE INVENTION

It is therefore an object of the invention to provide a method of and apparatus for multiplexing/demultiplexing digital signal streams of different hierarchy levels.

It is a further object of the invention to provide a method of and apparatus for determining the stuffing ratio in response to the measurement of clock frequency.

It is another object of the invention to provide a method of and apparatus for generating SRTS values.

It is yet another object of the invention to provide a method of and apparatus for performing stuffing digital signal streams.

It is still an object of the invention to provide a method of and apparatus for processing a plurality of digital signal streams in which context switching is applied to algorithm executions.

SUMMARY OF THE INVENTION

Briefly stated, according to one aspect, the invention is directed to a multiplexer of a plurality of first signal streams into a second signal stream, the first signal streams having a substantially similar first rate and the second signal stream having a second rate higher than the first rate. The multiplexer includes a buffer for buffering the first signal streams, a SRTS circuit for receiving a SRTS value of each first signal stream and a local SRTS circuit for generating a local SRTS value of each first signal stream based on a reference clock rate. The multiplexer includes further a stuffing circuit for stuffing the plurality of first signal streams in response to a stuff command signal which has been generated for each first signal stream in response to its respective SRTS value and local SRTS value and a combiner circuit for combining all the first signal streams into the second signal stream.

According to another aspect, the invention is directed to a demultiplexer for demultiplexing a first signal stream having a first rate into a plurality of second signal streams, each having a substantially similar rate that is lower than the first rate. The demultiplexer comprises a disassembling circuit for disassembling the first signal stream into the plurality of second signal streams and an incoming SRTS circuit for generating an incoming SRTS value for each of the second signal streams. The demultiplexer includes further an SRTS block for generating an outgoing SRTS value for each of the second signal streams in response to a difference between the incoming and outgoing SRTS values and an inserting circuit for inserting the outgoing SRTS value in each respective second signal stream.

According to yet another aspect, the invention resides in a process of multiplexing and demultiplexing between a plurality of first signal streams and a second signal stream, the first signal streams having a substantially similar first rate and the second signal stream having a second rate higher than the first rate. The invention is directed to a method of monitoring the first rate relative to the second rate which comprises steps of receiving a SRTS value of each first signal stream, generating a local SRTS value based on the second rate of the second signal stream, and calculating from the received SRTS value and the generated local SRTS value a difference indication proportional to the difference between the first and the second rates.

BRIEF DESCRIPTION OF THE DRAWINGS

FIG. 4 is a brief functional block diagram of a M12 multiplexer of a know design in the Tx direction.

FIG. 5 is a brief functional block diagram of a M12 multiplexer of a know design in the Rx direction.

DETAILED DESCRIPTION OF THE PREFERRED EMBODIMENTS OF THE INVENTION

Figure 1:
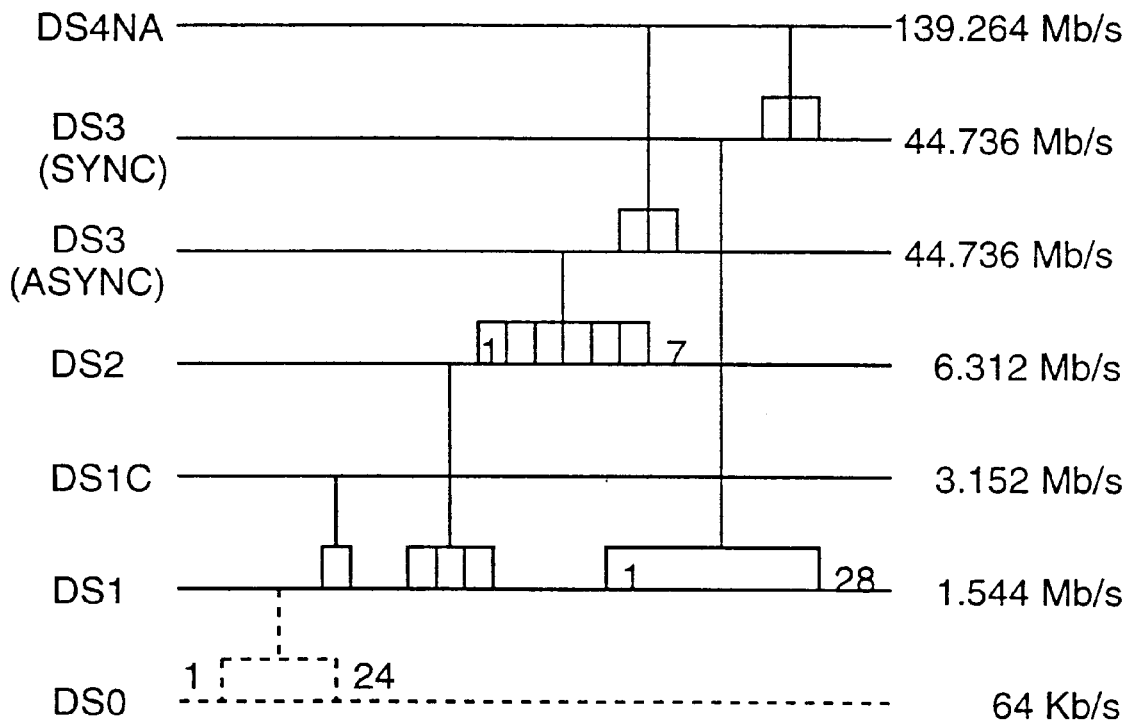
FIG. 1 is a chart showing a digital hierarchy used in the North America.
Figure 2:
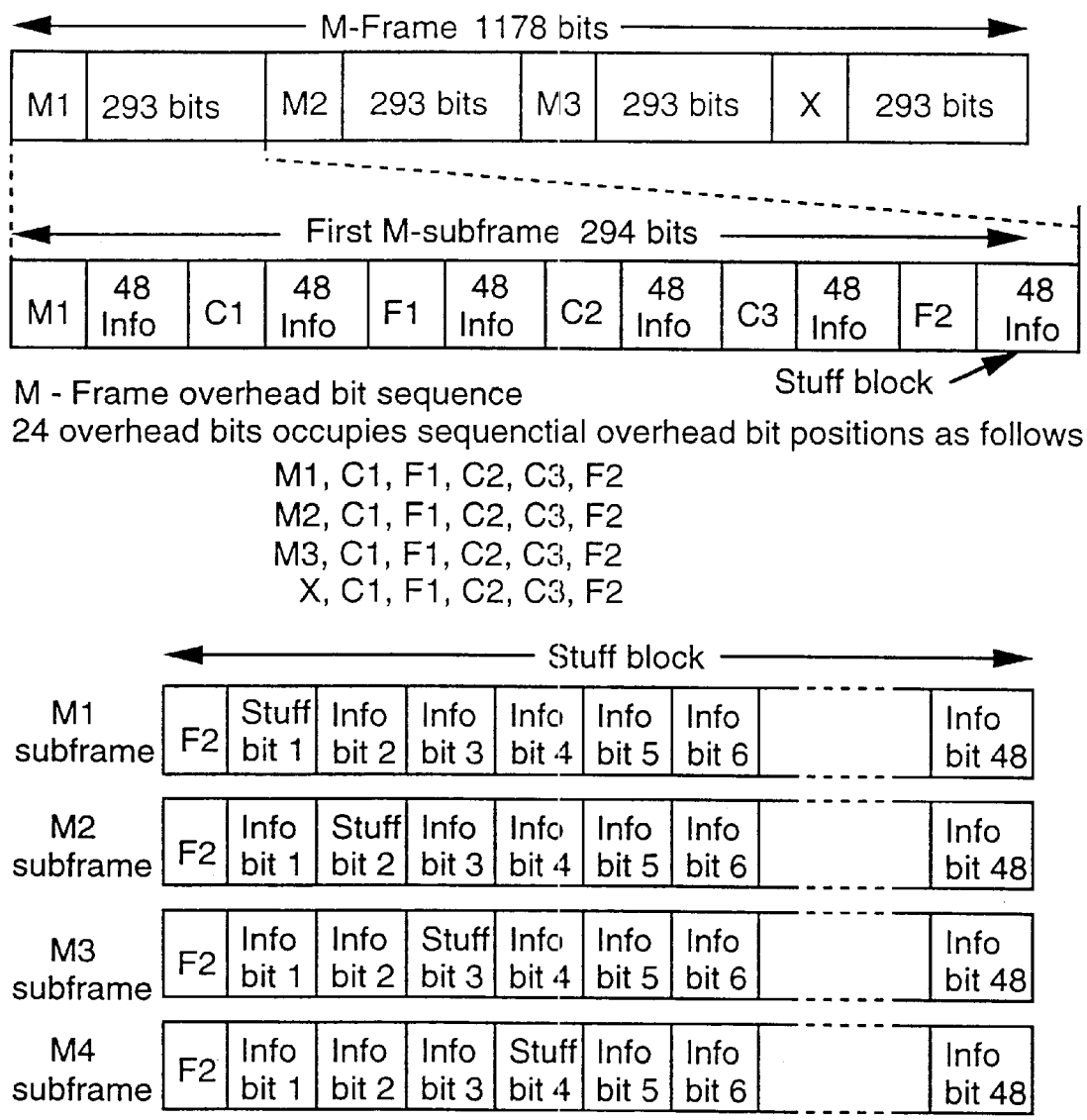
FIG. 2 shows the DS2 frame construction.
Figure 3:
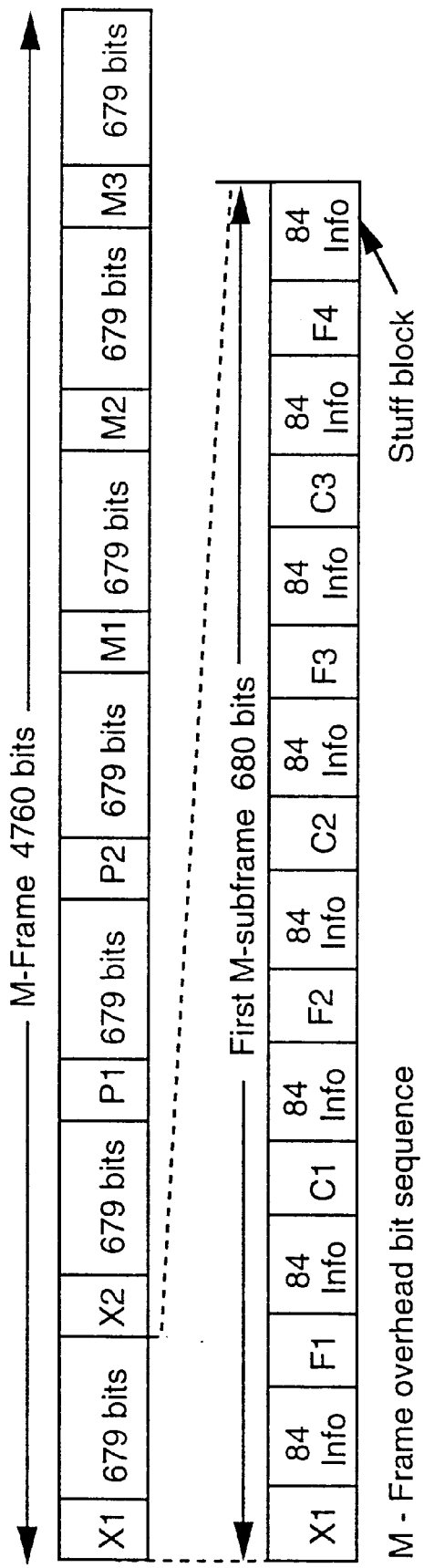
FIG. 3 shows the DS3 frame construction.
Figure 6:
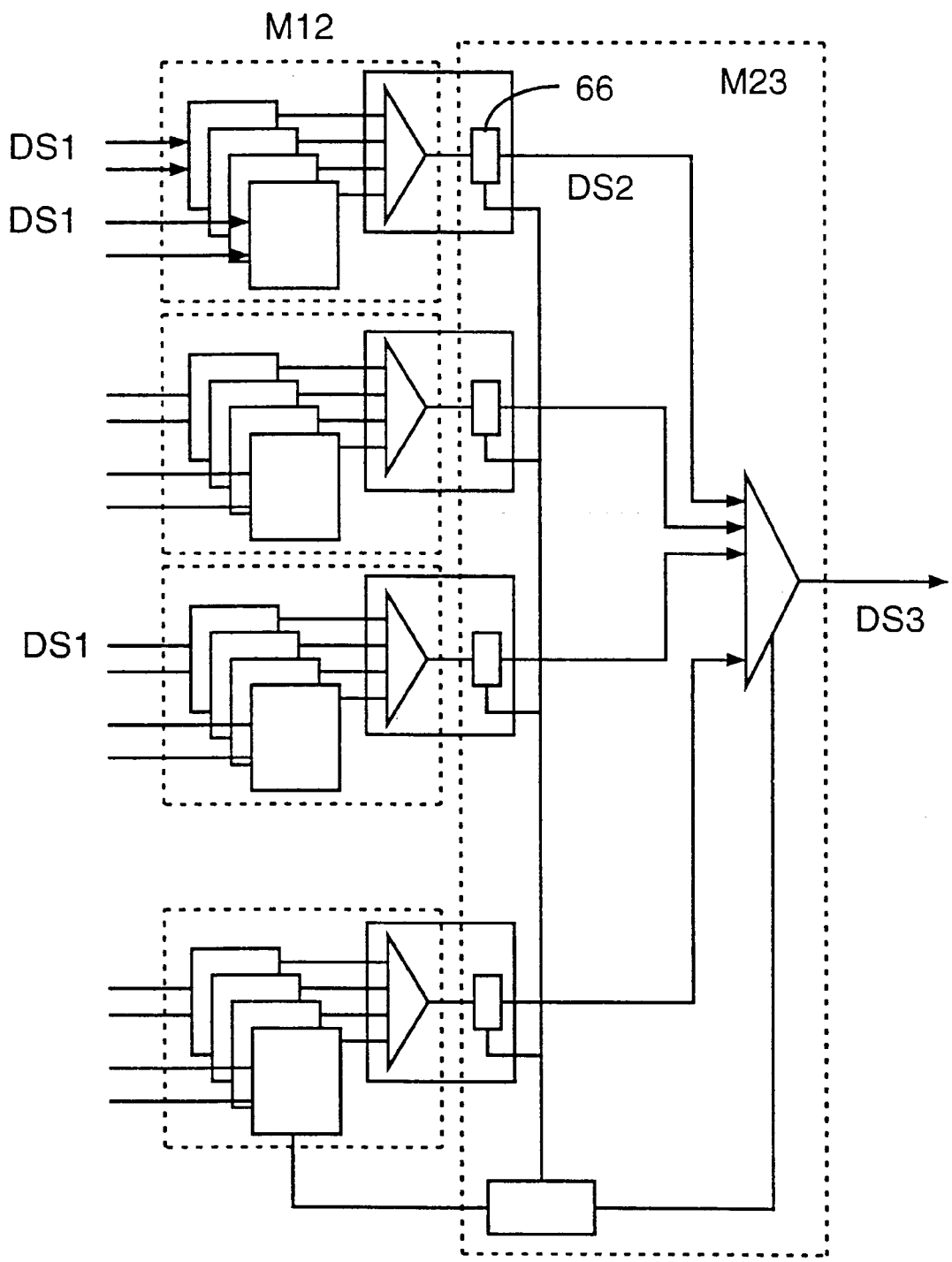
FIG. 6 shows a known M13 multiplexer which is a combination of M12 and M23.
Figure 7:
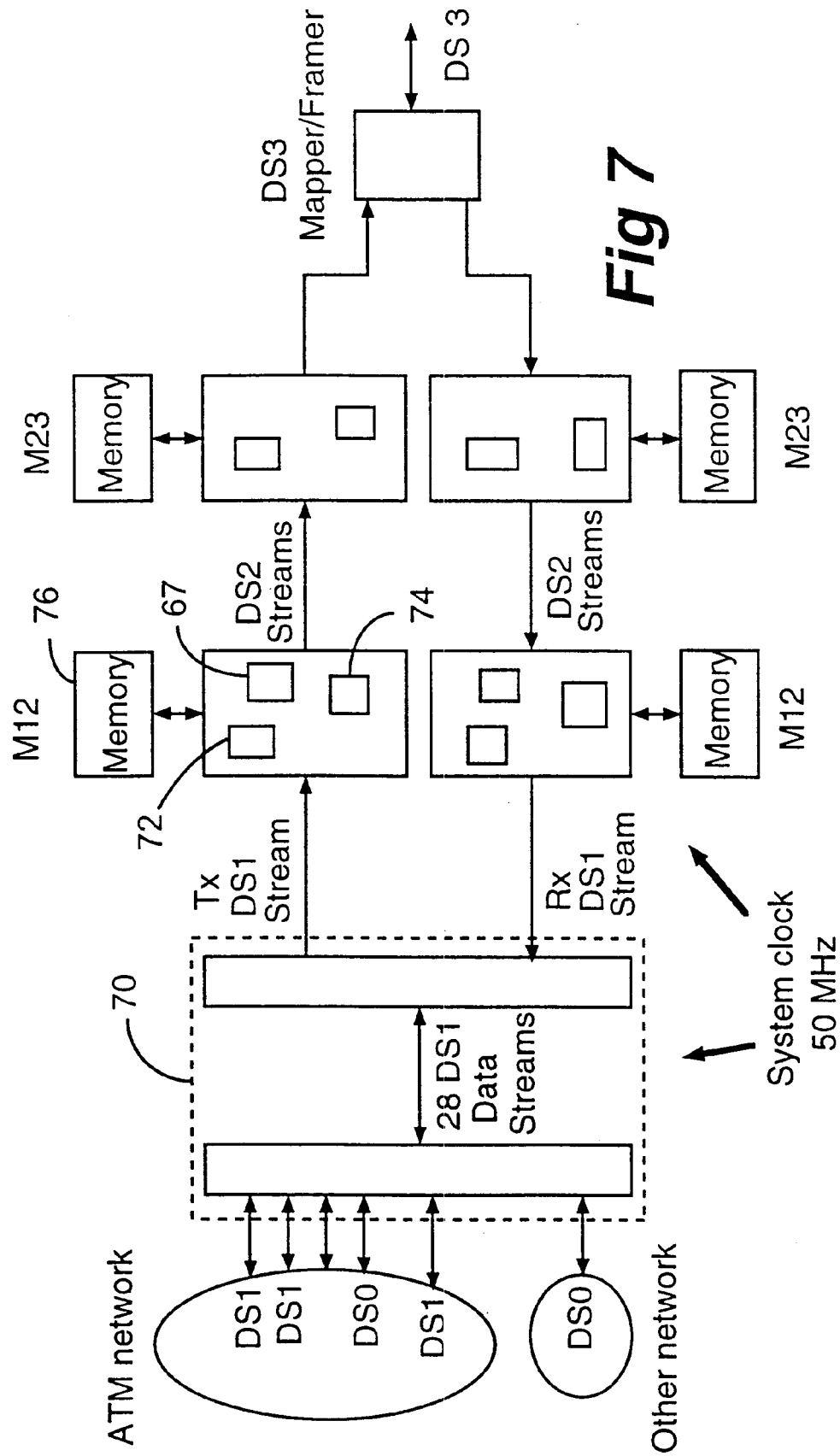
FIG. 7 is a functional block diagram multiplexer/demultiplexer which makes use of context switching according to one embodiment of the invention.

FIG. 7 is a functional block diagram of DS1-DS3 multiplexer/demultiplexer according to one embodiment of the invention. In this Figure, DS1 or DS0 signal streams are received from or sent to an ATM network or some other network and multiplexed into or demultiplexed from a DS3 signal stream. An interface arrangement 70 produces an octet stream of 28 DS1 signal streams in the Tx direction and receive them in the Rx direction. Each of 28 DS1 signal streams is processed by M12 mux which contains various sets of algorithms 72 and 74, e.g., a framing algorithm, SRTS algorithm, stuffing algorithm etc. The SRTS and stuffing algorithms will be described in detail below. These algorithms are executed on each of 28 DS1 signal streams by context switching in co-operation with a memory 76 and therefore the output of M12 is seven DS 2 signal streams. Each of seven DS2 signal streams is processed by multiplexer M23 which, like M12, contains necessary algorithms and executed by context switching. Seven DS2 signal streams are then combined and mapped onto a properly framed DS3 signal stream. In the Rx direction, a DS3 signal stream is processed by similar algorithms at M23 and M12. At M12, rate adjustment is performed by SRTS and stuffing algorithms, which will be described in detail below also.

As mentioned earlier, the process of multiplexing up to a DS3 and demultiplexing down from a DS3 introduces a much greater variability in the SRTS period than is seen in a normal period of 3008 DS1 bits as assumed by the prior art. This variability is due to a number of factors:

jitter on the DS3 signal stream,
the frame format of the DS3 which adds Frame bits, and stuff opportunities at the DS2 level,
jitter on the DS2 signal stream which can lead to saturation of the DS2 to DS3 stuffing mechanism which can lead to extended periods of all null stuffing and all data stuffing,
the frame format of the DS2 which adds Frame bits and stuff opportunities at the DS1 level,
jitter on the DS1 signal stream which can lead to saturation of the DS1 to DS2 stuffing mechanism which can lead to extended periods of all null stuffing and all data stuffing.

The overall effect of these factors is that the total elapsed time in which 3008 DS1 bits arrive via the DS3 signal stream or are sent out via the DS3 signal stream exceeds the bounds set by the 4 bit SRTS value which is used in the above-noted prior art.

Figure 8:
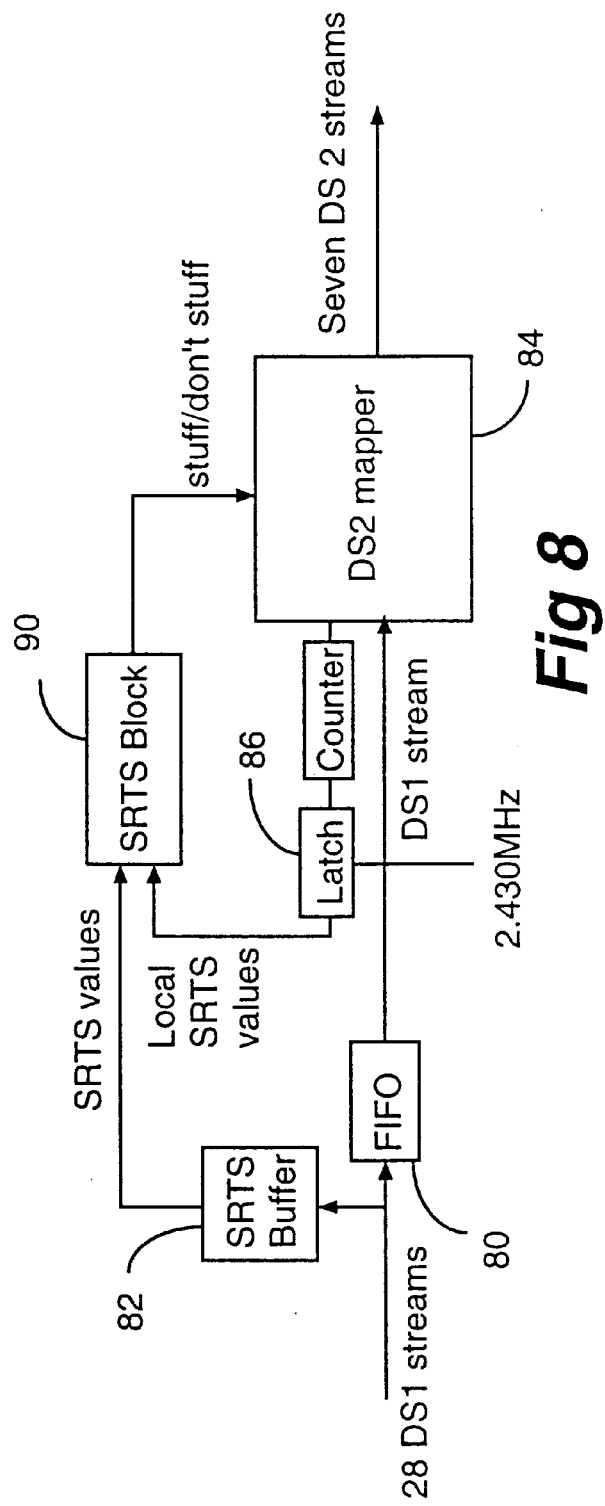
FIG. 8 is a functional block diagram of M12 in the Tx direction, according to one embodiment of the invention which includes a mechanism for generating a stuff command signal.

FIG. 8 is a functional block diagram of a multiplexer of DS1 signal streams to a DS2 signal stream, containing an embodiment of the invention. In the Figure, each of a plurality (e.g. 28) of DS1 signal streams is buffered at FIFO 80 and its SRTS value is recovered by a SRTS recovery buffer 82. This sequence of SRTS values is an indication of the rate of an incoming DS1 signal stream. A DS2 mapper 84 reads a DS1 stream stored in the FIFO. Having appropriately rate adjusted by stuffing, the DS2 mapper maps four DS1 signal streams into an outgoing DS2 signal stream. The stuffing action as well as DS2 framing takes place in the mapper 84. Decision to stuff the stuff position with a null bit or data bit is performed at SRTS Block 90. Therefore, a counter reads DS1 bits of a particular DS1 signal stream which is mapped to the DS2 signal stream. The counter performs a division by 3008 and latches the clock count of a network reference clock, e.g., 2.430 MHz. The content of the latch is the local SRTS value which is an indication of the rate of the particular outgoing DS1 stream multiplexed into the DS2 stream. The SRTS Block 90 compares the sequence of the recovered SRTS values and the sequence of local SRTS values and generates a command of stuff null or stuff data at a stuff position with respect to each of the 28 DS1 signal streams.

According to one embodiment, as in the case of multiplexing DS1 signal streams to a DS2 signal stream, each DS2 signal stream is further stuffed while a DS3 mapper maps seven DS2 signal streams into a DS3 signal stream. Seven DS2 signal streams are individually stuffed to align all the DS2 signal streams.

Figure 9:
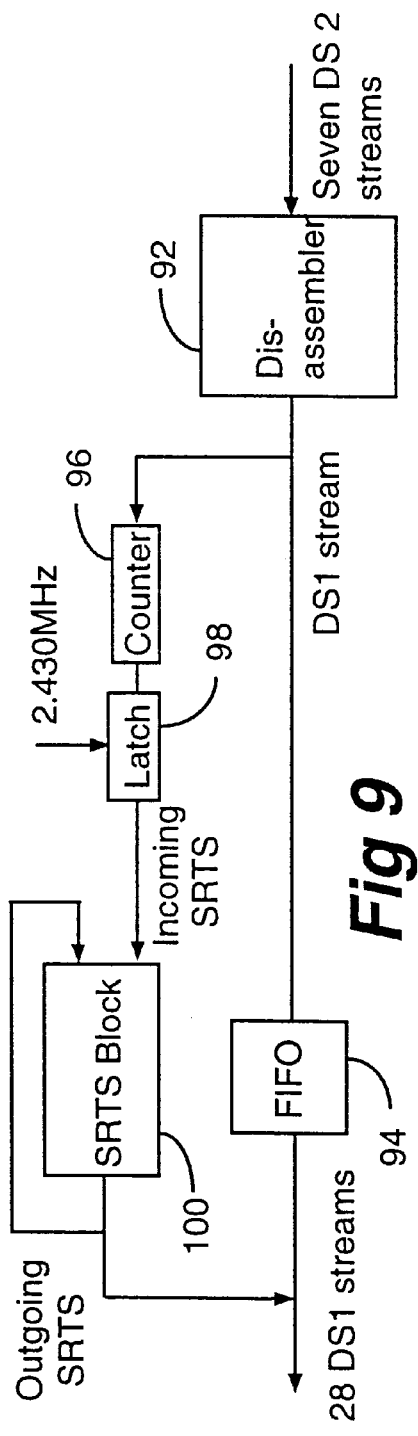
FIG. 9 is a functional block diagram of M12 in the Rx direction according to one embodiment of the invention which includes a mechanism for generating SRTS values.

FIG. 9 is a functional block diagram of a demultiplexer of a DS2 signal stream to DS1 signal streams, containing an embodiment of the invention. In the Figure each of seven DS2 signal streams is demultiplexed into 4 DS1 signal streams at disassembler 92. Each of a plurality of DS1 signal streams is buffered in a FIFO 94. A counter 96 counts the DS1 bits for a particular DS1 signal stream taking into account the presence or absence of a data bit in each stuff opportunity. The counter divides by 3008 and latches at latch 98 the clock count of a network reference clock, e.g., 2.430 MHz. The content of the latch is the incoming SRTS value, the sequence of which is an indication of the rate of the particular incoming DS1 stream. The SRTS block 100 generates an outgoing SRTS value, the sequence of which is an indication of the rate of a particular outgoing DS1 stream. The SRTS block compares the incoming SRTS sequence and the outgoing SRTS sequence and alters the outgoing SRTS sequence so that the outgoing rate for a particular DS1 signal stream will match the incoming rate for that DS1 signal stream. This SRTS sequence is embedded in each respective DS1 stream.

The function of SRTS block 90 of FIG. 8 consists of two parts. The first is used to define a stuffing ratio required to align the incoming data rate as defined by the sequence of incoming SRTS values and the outgoing data rate as defined by the sequence of local SRTS values. The second part produces a sequence of stuff values corresponding to the stuffing ratio determined above, which controls the outgoing data rate and feeds this back to the first section.

Part 1—Data Rate Alignment

The transmit DS3 channel is driven by a TX clock rate and it is necessary to provide a data bit for each TX clock. Each data bit may correspond to a DS3 frame bit or one of the seven DS2 channels (for which it may be a data bit or a stuff bit). In turn, each bit for a DS2 channel may correspond to a frame bit or one of the 28 DS1 channels where it too may be a data bit or a stuff bit.

The process for data rate alignment is triggered by the request to send DS1 bits. When a particular DS1 has requested a total of 3008 bits, a new local SRTS value is computed and a new incoming SRTS value is read. The difference between successive local SRTS values is computed and is an indication of the clock rate for the outgoing DS1 bits. The difference between incoming SRTS values is calculated and is an indication of the clock rate of the incoming DS1 data stream. The difference between these differences is a measure of how far apart the incoming and outgoing clock rates are. The circuit then accumulates the difference of differences and attempts to adjust the outgoing SRTS rate so that the cumulative difference is zero thereby ensuring that the two frequencies are in alignment. In this process, the local delta SRTS values will be varying considerably, whereas the outgoing delta SRTS values will be smoothed to a roughly constant value.

Part 2—Stuffing Ratio Tracking:

For a given DS2 rate, nominally 6.312 Mb/s, the outgoing DS1 data rate can be controlled by altering the stuffing ratio that is used. Referring back to FIG. 4, within a DS2 sub-frame either 287 or 288 bits of DS1 data can be transmitted. This means that on average, over a large number of frames, the range of DS1 rates that can be supported is between 287/1176*6.312=1.5404 Mb/s and 288/1176*6.312=1.5458 Mb/s (there are 1176 bits per DS2 frame).

Part one of the invention above determines the data rate of the outgoing data stream. This data rate is expressed as a desired stuffing ratio that will range between 0 and 100%. Whatever the stuffing ratio is, part two of the invention produces a sequence of stuff/don't stuff signals that will correspond to the desired stuffing ratio.

For example, a nominal DS1 data rate of 1.544 Mb/s is to be produced, this corresponds to a stuffing ratio of 66% which in turn translates to 287.665(=1.544/6.312*1176) data bits per sub-frame. The correct sequence of stuff/don't stuff signals for this data rate is then:

1 1 0 1 1 0 1 1 0 . . .

where 1 means that a data bit is added and 0 means that a null bit is added.

In order to generate a sequence of 0s and 1s that average out to the desired stuffing ratio, one represents the stuffing ratio as a ratio between an N bit target value and an N bit denominator, i.e., target/$2^N$. With this representation, the stuffing ratio can range from 0 to $(2^N-1)/(2^N)$. If the target value is summed $2^N$ times, then the total will be $(2^N)$*target. If the sum is computed modulo $2^N$, and a 1 selected whenever the sum is $2^N$ or greater and 0 whenever the sum is less than $2^N$, then after $2^N$ samples a 1 will be produced exactly target times and a 0 $\{(2^N)\text{-target}\}$ times. The average value will be exactly that required, namely target/$(2^N)$, and the sequence of ones and zeros will be distributed as evenly as possible, thereby minimizing the error of the average stuffing ratio with respect to the desired stuffing ratio.

Using a fraction to represent the desired stuffing ratio will introduce an inherent error between the actually clock rate and that indicated by the desired rate. This can be minimized by making N sufficiently large, however, the process is self correcting. For a given target value, the outgoing and incoming clock rates may differ which will lead to a drift in the respective SRTS differences. When this difference is sufficient, the target value will be adjusted by one thereby causing the outgoing clock rate to change so that the differences will drift in the opposite direction. This will continue indefinitely with the average of the two target values reflecting the true incoming clock rate.

The function of SRTS block 100 of FIG. 9 consists also of two parts. These functions are almost identical to those used for multiplexer. Like multiplexer, the first is used to define a target delta SRTS value required to align the incoming data rate as defined by the sequence of incoming SRTS values and the outgoing data rate as defined by the sequence of outgoing SRTS values. The second part produces a sequence of SRTS values whose difference corresponds to the target delta SRTS value determined above, which controls the outgoing data rate and feeds this back to the first section.

Figure 10:
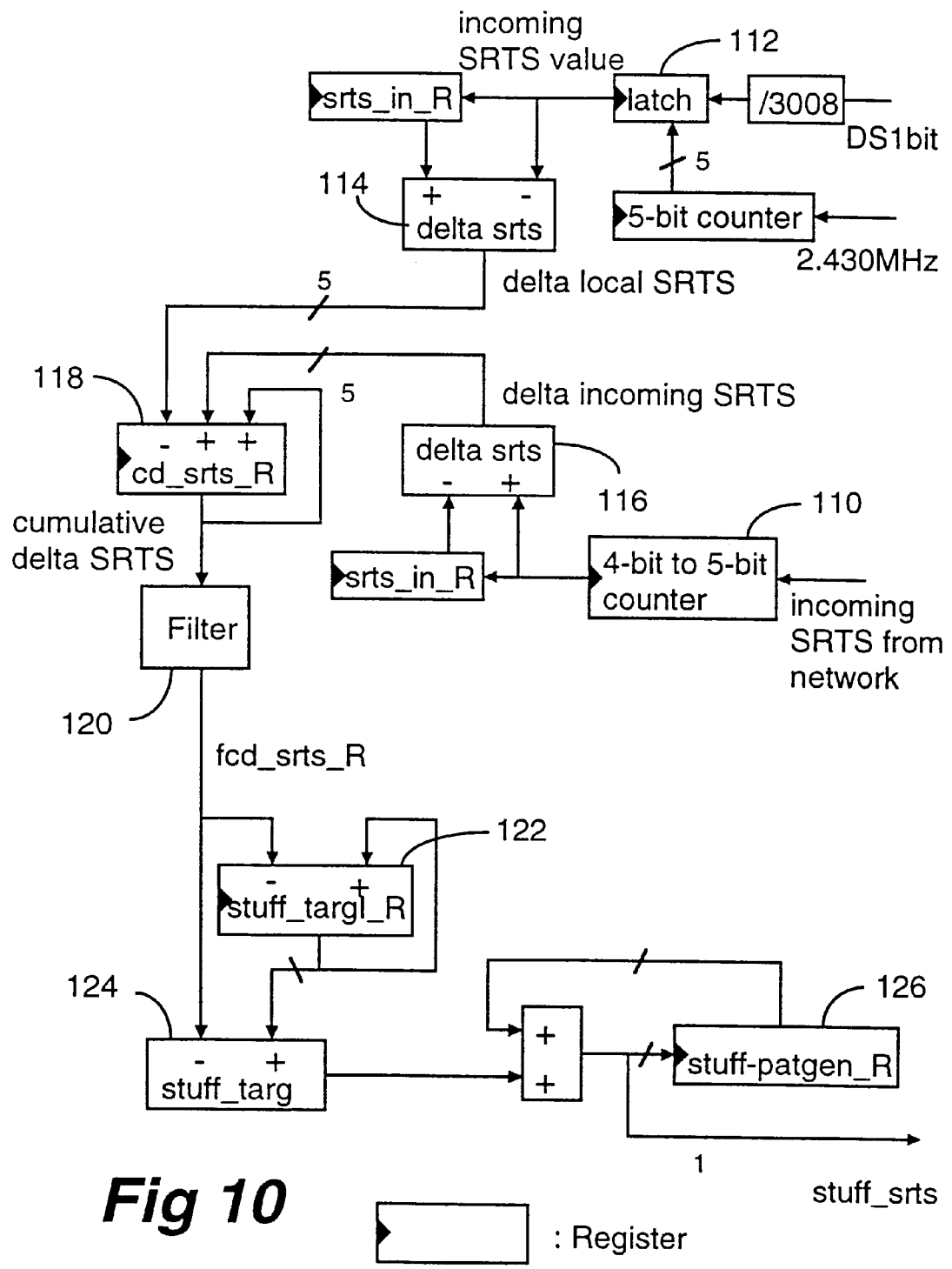
FIG. 10 is a detailed block diagram of SRTS block 90 shown in FIG. 8.
Figure 11:
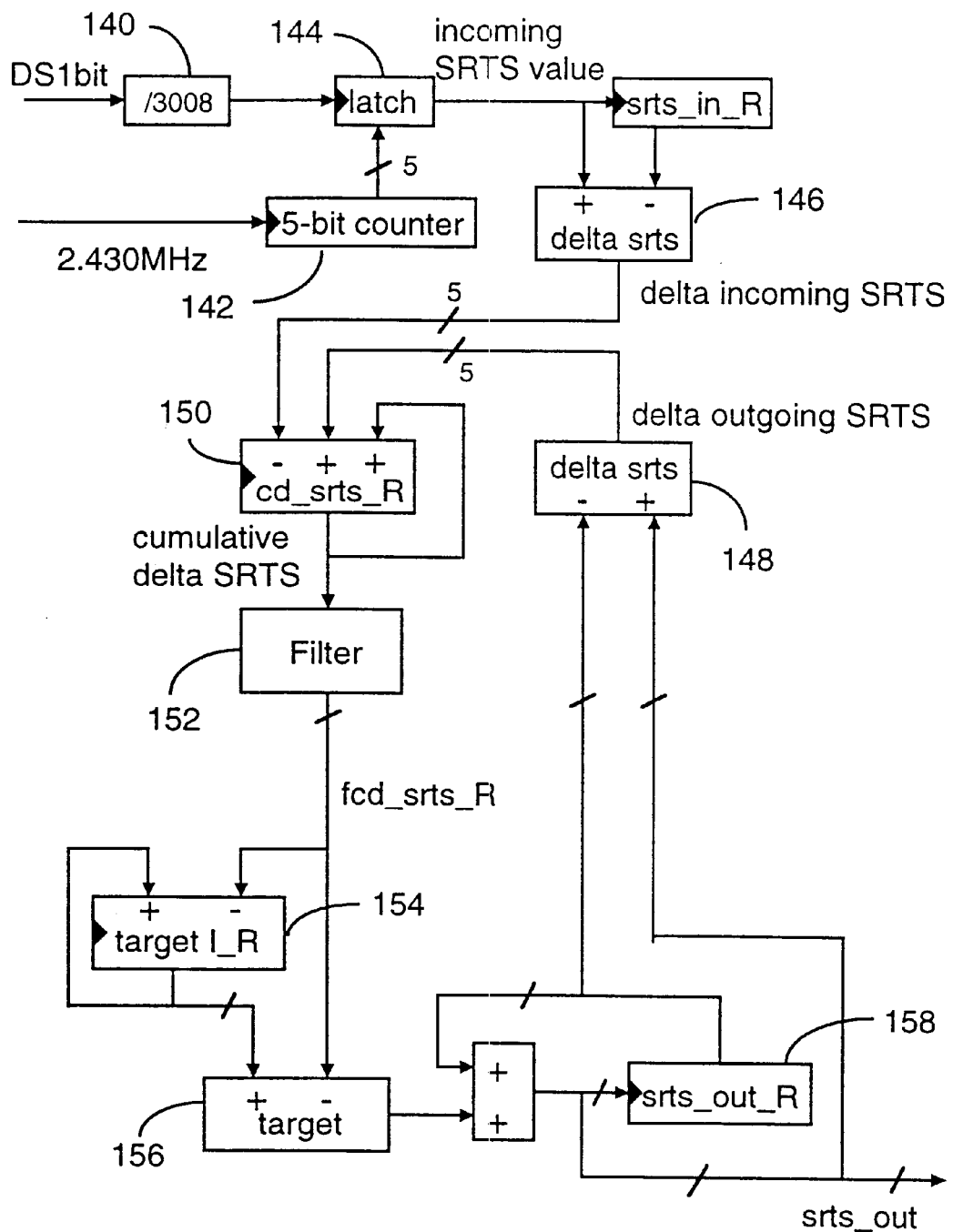
FIG. 11 is a detailed block diagram of SRTS block 100 shown in FIG. 9.

Referring to FIGS. 10 and 11, SRTS logic block 90 of FIG. 8 for Tx direction and SRTS logic block 100 of FIG. 9 for Rx direction are described below in more detail in connection with one embodiment of the invention.

Referring to FIG. 10 in particular, an incoming SRTS value from the network is 4 bits wide which is converted to 5 bits wide at 110. A DS1 stream (DS1 bit) is divided by 3008 which then causes the 5 bit counter of the network reference clock to be latched at latch 112. The content of the latch is the local SRTS value. Delta local SRTS is a difference between successive local SRTS values and is calculated at delta_srts 114. Meanwhile, delta incoming SRTS is a difference between successive incoming SRTS values and is calculated at delta_srts 116. A difference between two deltas, delta local SRTS and delta incoming SRTS, is accumulated at 118 which produces cumulative delta SRTS, cd_srts_R. The cumulative delta SRTS is then filtered at 120 to help remove the jitter due to the framing formats, DS2 and DS3 jitter in addition to source jitter and SRTS variability. Using the filtered cumulative delta SRTS value, fcd_srts_R, as an error function, this is applied to the proportional/integrating control system implemented by 122 and 124. The result is a stuffing target value that is controlled so that the filtered cumulative delta SRTS value tends to zero. With a stuffing target so generated, the stuffing sequence generator, 126, will produce a sequence of stuff null and stuff data that averages out to the ratio specified by the stuffing target.

Referring to FIG. 11, a DS1 stream (DS1 bit) 140 from the demultiplexer, is divided by 3008 which then causes the 5 bit counter 142 of the network reference clock to be latched at latch 144. The content of the latch represents the incoming SRTS value. A difference between successive incoming SRTS values is computed at delta_srts 146. At the same time, a difference of successive outgoing SRTS values is computed at delta_srts 148 and converted to a 5 bit value. Another difference of these two deltas is computed and accumulated at cd_srts_R 150. This is the cumulative delta SRTS value. This value is then filtered at 152 to remove jitter due to the framing formats, DS2 and DS3 jitter in addition to source jitter and outgoing SRTS variability. Using the filtered cumulative delta SRTS value, fcd_srts_R, as an error function, this is applied to the proportional/integrating control system implemented by 154 and 156. The result is a delta SRTS target that is controlled so that the filtered cumulative delta SRTS value tends to zero. With a delta SRTS value so generated, the SRTS sequence generator 158 will produce a sequence of SRTS values such that the difference between successive values averages out to the value specified by the target.

According to yet a further embodiment, referring to FIGS. 10 and 11, the contents of the various registers that make up the algorithm are stored in a memory for each of the 28 DS1s. As each DS1 is processed, the values for the registers are loaded from the memory, the registers are updated appropriately, and the new values stored back into memory. Furthermore, context switching allows a single set of hardware registers along with a memory can replace 28 sets of the DS1 hardware registers which would be required for the prior art techniques mentioned above. It is therefore possible to achieve much higher levels of integration.

What is claimed is:

1. A multiplexer of a plurality of first signal streams into a second signal stream, the first signal streams having a substantially similar first rate and the second signal stream having a second rate higher than the first rate, comprising:

a buffer for buffering the first signal streams;

an SRTS circuit for receiving SRTS values of each first signal stream;

a local SRTS circuit for generating local SRTS values of each first signal stream based on a reference clock rate;

a stuffing circuit for stuffing the plurality of first signal streams in response to a stuff command signal which has been generated for each first signal stream in response to its respective sequences of SRTS values and local SRTS values; and a combiner circuit for combining all the first signal streams into the second signal stream.

2. The multiplexer according to claim 1 further comprising:

the SRTS circuit including delta circuits for calculating a first difference of successive SRTS values;

the local SRTS circuit including local delta circuits for calculating a second difference of successive local SRTS values, and a cumulative delta circuit for registering a cumulative value of a third difference between the first and second differences for each first signal stream.

3. The multiplexer according to claim 2 further comprising:

a stuff command circuit for generating the stuff command signal in response to the cumulative value of the third difference.

4. The multiplexer according to claim 1 further comprising:

a memory for storing instantiation values of the SRTS circuit, local SRTS circuit and stuffing circuit for each first signal stream, and a processor for performing context switching the executions of the SRTS circuit, local SRTS circuit and the stuffing circuit for each first signal stream.

5. The multiplexer according to claim 3 further comprising:

a memory for storing instantiation values of the SRTS circuit, local SRTS circuit, delta SRTS circuits, delta local SRTS circuit, stuffing circuit, and stuff command circuit for each first signal stream, and a processor for performing context switching the executions of the SRTS circuit, local SRTS circuit, delta SRTS circuits, delta local SRTS circuit, stuffing circuit, and stuff command circuit for each first signal stream.

6. The multiplexer according to claim 3 wherein the stuff command circuit comprises:

a stuff target circuit for comparing the cumulative value of the third difference and a target stuff ratio to generate the stuff command signal.

7. The multiplexer according to claim 5 wherein the first and second signal streams are chosen from any one group of the followings, DS1, DS2, and DS3, and E1, E2 and E3.

8. The multiplexer according to claim 6 wherein the first and second signal streams are chosen from any one group of the followings, DS1, DS2, and DS3, and E1, E2 and E3.

* * * * *